US009151107B2

(12) United States Patent
Kaczmarczyk et al.

(10) Patent No.: US 9,151,107 B2
(45) Date of Patent: Oct. 6, 2015

(54) TRAILER DOOR SEAL

(71) Applicant: PRESS-SEAL GASKET CORPORATION, Fort Wayne, IN (US)

(72) Inventors: John M. Kaczmarczyk, Angola, IN (US); Jim D. Gamble, Garrett, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 0 days.

(21) Appl. No.: 14/495,453

(22) Filed: Sep. 24, 2014

(65) Prior Publication Data

US 2015/0082705 A1    Mar. 26, 2015

Related U.S. Application Data

(60) Provisional application No. 61/881,783, filed on Sep. 24, 2013.

(51) Int. Cl.
*E06B 7/16* (2006.01)
*E06B 7/23* (2006.01)
(Continued)

(52) U.S. Cl.
CPC ........... *E06B 7/2312* (2013.01); *B60J 10/0091* (2013.01); *B60J 10/086* (2013.01); *E06B 7/231* (2013.01); *E06B 7/2309* (2013.01); *E06B 7/2314* (2013.01)

(58) Field of Classification Search
CPC ....... E06B 7/2312; E06B 7/2303; E06B 7/22; E06B 7/2314
USPC ............. 49/366, 367, 368, 369, 483.1, 484.1, 49/498.1
See application file for complete search history.

(56) References Cited

U.S. PATENT DOCUMENTS

| 1,763,603 | A | 6/1930 | Donahue |
| 2,503,882 | A | 4/1950 | Medford |
| 2,575,793 | A | 11/1951 | Bush |

(Continued)

FOREIGN PATENT DOCUMENTS

| CH | 396382 | * | 7/1965 |
| DE | 2415460 A1 | * | 12/1974 |

(Continued)

OTHER PUBLICATIONS

International Search Report and Written Opinion dated Dec. 23, 2011 in corresponding International Application No. PCT/US2011/04557.

(Continued)

*Primary Examiner* — Jerry Redman
(74) *Attorney, Agent, or Firm* — Faegre Baker Daniels LLP

(57) ABSTRACT

A sealing system seals the perimeter of insulated hinged double doors. The sealing system includes first and second exterior seals made of a monolithic, resilient and elastically deformable material. The first exterior seal has an elongated lobe for contacting the exterior of said door, and both of the first and second exterior seals have an interior lobe which contact one another when the doors are closed. The sealing system further includes first and second inner seals made of a monolithic, resilient and elastically deformable material, each having a pair of spaced-apart sealing lobes. The inner seals are mounted to respective doors in a staggered fashion, such that the respective pairs of sealing lobes interact with one another to create a redundant, weather-resistant and thermally robust seal when the double doors are closed.

20 Claims, 3 Drawing Sheets

(51) Int. Cl.
*B60J 10/00* (2006.01)
*B60J 10/08* (2006.01)

(56) References Cited

U.S. PATENT DOCUMENTS

| | | | |
|---|---|---|---|
| 2,591,833 A | 4/1952 | Kreimendahl | |
| 2,593,305 A | 4/1952 | Hunter | |
| 2,647,792 A | 8/1953 | Flemming | |
| 2,811,406 A | 10/1957 | Moore et al. | |
| 2,827,114 A | 3/1958 | Stroup | |
| 2,912,727 A | 11/1959 | Sehn | |
| 3,056,451 A | 10/1962 | Federline et al. | |
| 3,076,499 A | 2/1963 | Zoll et al. | |
| 3,161,925 A * | 12/1964 | Bertolini | 49/368 |
| 3,174,793 A | 3/1965 | Nallinger et al. | |
| 3,198,242 A | 8/1965 | Crosswell | |
| 3,339,619 A | 9/1967 | Crosswell | |
| 3,378,958 A * | 4/1968 | Parks et al. | 49/489.1 |
| 3,424,222 A | 1/1969 | Stoner et al. | |
| 3,456,390 A | 7/1969 | Hulverson et al. | |
| 3,461,611 A * | 8/1969 | Axe | 49/483.1 |
| 3,518,792 A | 7/1970 | Williamson et al. | |
| 3,693,693 A | 9/1972 | Court | |
| 3,717,955 A | 2/1973 | Urbanick | |
| 3,784,243 A | 1/1974 | Pastva, Jr. | |
| D233,033 S | 10/1974 | Donne | |
| 3,886,686 A | 6/1975 | Urbanick | |
| 4,001,974 A | 1/1977 | Wright | |
| 4,006,562 A | 2/1977 | Belanger et al. | |
| 4,010,573 A | 3/1977 | Andrzejewski | |
| 4,014,138 A * | 3/1977 | White | 49/367 |
| 4,015,368 A * | 4/1977 | Court et al. | 49/489.1 |
| 4,085,966 A * | 4/1978 | Ringe | 296/146.5 |
| 4,119,325 A | 10/1978 | Oakley et al. | |
| 4,288,135 A | 9/1981 | Buchser | |
| D263,749 S | 4/1982 | Sorensen | |
| 4,403,452 A | 9/1983 | Urbanick | |
| 4,447,065 A | 5/1984 | Dupuy et al. | |
| 4,527,807 A | 7/1985 | Urbanick | |
| 4,586,552 A | 5/1986 | Labelle | |
| 4,643,239 A | 2/1987 | Wentzel | |
| 4,656,785 A | 4/1987 | Yackiw | |
| 4,678,227 A | 7/1987 | Castagno | |
| 4,752,350 A | 6/1988 | Schuster | |
| 4,769,947 A | 9/1988 | Ogawa et al. | |
| 4,900,040 A | 2/1990 | Miller | |
| 4,910,918 A | 3/1990 | Naples et al. | |
| 4,928,431 A | 5/1990 | Kuzuhara et al. | |
| 4,957,301 A | 9/1990 | Clay, Jr. et al. | |
| 4,963,219 A | 10/1990 | Nichols et al. | |
| 4,995,935 A | 2/1991 | Ganzberger | |
| 5,107,622 A * | 4/1992 | Fuchs et al. | 49/484.1 |
| 5,172,744 A | 12/1992 | Finch et al. | |
| 5,398,451 A | 3/1995 | Mesnel | |
| 5,421,944 A | 6/1995 | Davis et al. | |
| 5,423,147 A | 6/1995 | Depuy | |
| 5,435,104 A | 7/1995 | Dietrich | |
| 5,493,814 A | 2/1996 | Christian | |
| 5,499,475 A * | 3/1996 | Court et al. | 49/495.1 |
| 5,511,343 A | 4/1996 | Guillon | |
| 5,538,317 A | 7/1996 | Brocke et al. | |
| 5,584,960 A | 12/1996 | Hunter et al. | |
| 5,626,383 A | 5/1997 | Lee et al. | |
| 5,855,720 A | 1/1999 | Johnson et al. | |
| 5,964,499 A * | 10/1999 | Carter | 296/186.4 |
| 5,970,659 A | 10/1999 | Oord | |
| 6,021,609 A | 2/2000 | Teishi | |
| 6,056,033 A | 5/2000 | Schwaiger | |
| 6,098,696 A | 8/2000 | Styra | |
| 6,117,265 A | 9/2000 | Cittadini et al. | |
| 6,119,752 A | 9/2000 | Zollinger et al. | |
| 6,129,805 A | 10/2000 | Valentin | |
| 6,158,171 A * | 12/2000 | Kellogg et al. | 49/489.1 |
| 6,273,433 B1 | 8/2001 | Yu | |
| 6,374,567 B1 | 4/2002 | Mullet | |
| 6,405,489 B1 | 6/2002 | Miura | |
| 6,478,308 B1 * | 11/2002 | McMillin et al. | 277/630 |
| 6,527,278 B1 | 3/2003 | Norris | |
| 6,598,347 B2 | 7/2003 | Hattori | |
| 6,616,878 B2 | 9/2003 | Harada et al. | |
| 6,640,499 B2 | 11/2003 | Yamashita et al. | |
| 6,725,605 B2 | 4/2004 | Schlachter et al. | |
| 6,772,560 B2 | 8/2004 | Dischiant et al. | |
| 6,772,561 B1 | 8/2004 | Berger, Jr. | |
| 6,777,068 B2 | 8/2004 | Teramoto et al. | |
| 6,802,666 B1 | 10/2004 | Bormann et al. | |
| 6,875,305 B2 | 4/2005 | Tesch | |
| 6,996,936 B1 | 2/2006 | Maass | |
| 7,025,105 B2 | 4/2006 | Lancina | |
| 7,128,123 B2 | 10/2006 | Mullet et al. | |
| 7,306,839 B2 | 12/2007 | Kubo et al. | |
| 7,493,686 B2 | 2/2009 | Barford | |
| 7,578,098 B2 | 8/2009 | Furuzawa et al. | |
| 7,935,211 B2 | 5/2011 | LaSusa | |
| 8,146,985 B2 | 4/2012 | Nelson | |
| 8,157,270 B2 | 4/2012 | Tsou et al. | |
| 8,272,178 B2 | 9/2012 | Pardue et al. | |
| 8,765,041 B2 | 7/2014 | Minoura et al. | |
| 8,839,564 B2 * | 9/2014 | Happel et al. | 49/495.1 |
| 2001/0008058 A1 | 7/2001 | Kawai et al. | |
| 2001/0034977 A1 | 11/2001 | Hattori | |
| 2002/0026751 A1 | 3/2002 | Kawai et al. | |
| 2002/0139054 A1 | 10/2002 | Schlachter et al. | |
| 2004/0250474 A1 | 12/2004 | Kubo et al. | |
| 2005/0161172 A1 | 7/2005 | Rekret | |
| 2005/0193636 A1 | 9/2005 | Jyawook et al. | |
| 2007/0245635 A1 | 10/2007 | Deguchi et al. | |
| 2009/0000205 A1 | 1/2009 | Bright et al. | |
| 2012/0304543 A1 | 12/2012 | Preising et al. | |
| 2014/0360101 A1 * | 12/2014 | Whiting, Jr. | 49/490.1 |

FOREIGN PATENT DOCUMENTS

| | | | |
|---|---|---|---|
| DE | 2758824 | * | 7/1979 |
| DE | 2806114 | * | 8/1979 |
| DE | 103 10 101 | | 9/2004 |
| EP | 0 178 064 | | 4/1986 |
| FR | 1310766 | * | 11/1962 |

OTHER PUBLICATIONS

Non-Final Office Action dated Apr. 3, 2013 in U.S. Appl. No. 13/193,268.

Final Office Action dated Nov. 22, 2013 in U.S. Appl. No. 13/193,268.

* cited by examiner

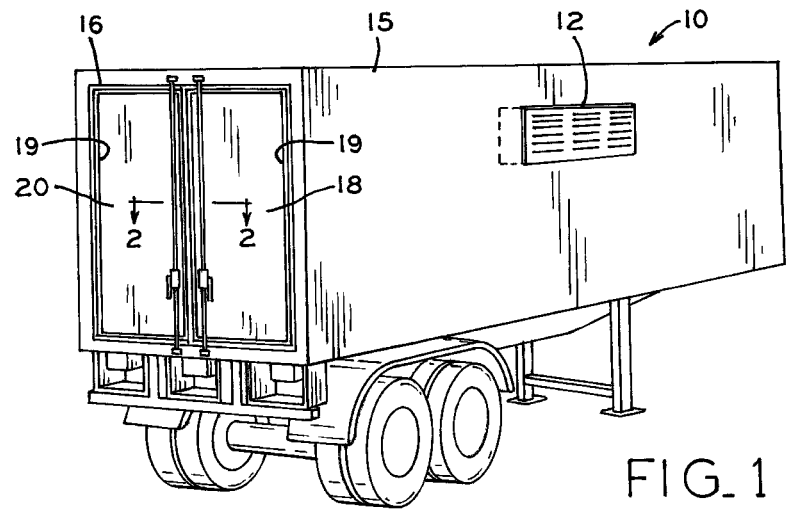
FIG_1
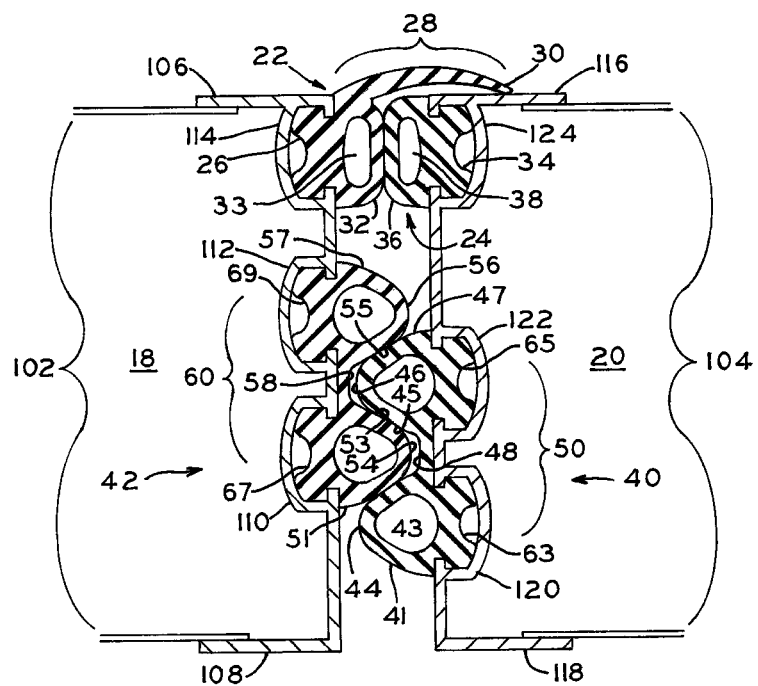
FIG_2

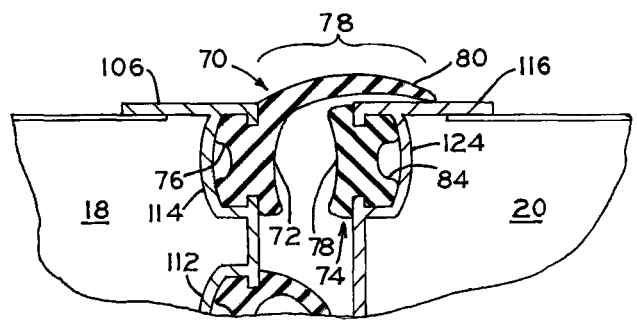
FIG_4
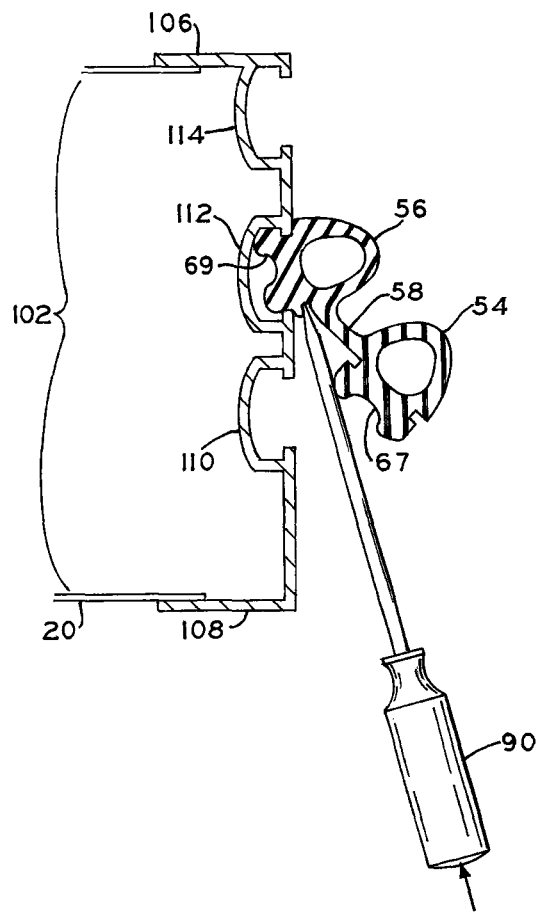
FIG_5

TRAILER DOOR SEAL

CROSS-REFERENCE TO RELATED APPLICATIONS

This application claims the benefit under Title 35, U.S.C. §119(e) of U.S. Provisional Patent Application Ser. No. 61/881,783, filed on Sep. 24, 2013 and entitled TRAILER DOOR SEAL, the entire disclosure of which is hereby expressly incorporated by reference herein.

BACKGROUND

1. Technical Field

The present disclosure relates to seals, and in particular, to seals that are adapted to seal doors such as those associated with semi-trailer trucks, boxcars, shipping containers, and buildings.

2. Description of Related Art

Seals that are used on the doors of truck trailers may be designed to help insulate the contents contained within, and may be formed as a plurality of separate door-edge sections that are joined at their respective corners using molded corner blocks joined to adjacent pairs of the door-edge sections via glue or silicone caulk, for example. These multi-piece seals may be expensive and difficult to install and maintain.

Other seals may be pre-formed to fit a given truck door size. These seals normally cannot be substantially deformed without compromising the effectiveness of the seal, and are therefore packaged and shipped as a single, door-shaped piece in a large, flat shipping container having approximately the same dimensions as the door to which the seal will be mounted. This relatively large shipping size and configuration adds to the overall cost of implementing such a pre-formed seal.

What is needed is an improvement over the foregoing.

SUMMARY

A sealing system is provided for sealing the perimeter of insulated hinged double doors. The sealing system includes first and second exterior seals made of a monolithic, resilient and elastically deformable material. The first exterior seal has an elongated lobe for contacting the exterior of said door, and both of the first and second exterior seals have an interior lobe which contact one another when the doors are closed. The sealing system further includes first and second inner seals made of a monolithic, resilient and elastically deformable material, each having a pair of spaced-apart sealing lobes. The inner seals are mounted to respective doors in a staggered fashion, such that the respective pairs of sealing lobes interact with one another to create a redundant, weather-resistant and thermally robust seal when the double doors are closed.

In an exemplary embodiment, the seal is formed from an elastomeric material that is elastically deformable, resilient, compressible and packable by rolling, stuffing or folding into a compact space. The seal material retains a constant deformation force over an extended period of time, and accommodates repeated deformations while maintaining a fluid-tight seal that seals the inside of the trailer from the outside environment. The elastic deformation and monolithic, one-piece design simplifies installation as the seal will stretch over the door and hold itself in place. Moreover, the seal is both weather resistant in subzero temperatures and resistant to degradation by UV exposure.

In one form thereof, the present disclosure provides a sealing system for sealing a space between a pair of hinged doors, said sealing system comprising: a first inner seal having a first inner lobe and a first outer lobe defining a first lobe receiving space therebetween; and a second inner seal having a second inner lobe and a second outer lobe defining a second lobe receiving space therebetween, the first lobe receiving space sized to receive the second outer lobe such that the second outer lobe sealingly abuts the first inner lobe and the first outer lobe, and the second lobe receiving space sized to receive the first inner lobe such that the first inner lobe sealingly abuts the second inner lobe and the second outer lobe, whereby the first inner seal and the second inner seal are arrangeable in a staggered fashion to form a redundant, weather-resistant and thermally robust seal in a space between two doors.

In another form thereof, the present disclosure provides a sealing system for sealing a space between a pair of hinged doors, said sealing system comprising: a first hinged door pivotable between a first open position and a first closed position; a second hinged door pivotable between a second open position and a second closed position, the first and second hinged doors having adjacent vertical edges which swing outwardly and away from one another as the first and second hinged doors pivot from the first and second closed positioned toward the first and second open positions respectively; a first inner seal attached to the first hinged door and having a first inner lobe and a first outer lobe defining a first lobe receiving space therebetween; and a second inner seal attached to the second hinged door and having a second inner lobe and a second outer lobe defining a second lobe receiving space therebetween, the first inner seal attached in a staggered arrangement with respect to the second inner seal such that, when the first and second doors and in the first and second closed positions respectively, the first lobe receiving space sealingly receives the second outer lobe and the second lobe receiving space sealingly receives the first inner lobe to form a redundant seal in a space between the first and second hinged doors.

BRIEF DESCRIPTION OF THE DRAWINGS

The above-mentioned and other features and advantages of this disclosure, and the manner of attaining them, will become more apparent and the invention itself will be better understood by reference to the following descriptions of embodiments of the invention taken in conjunction with the accompanying drawings, wherein:

FIG. 1 is a rear perspective view of a semi-trailer truck including doors that are fitted with seals according to the present disclosure;

FIG. 2 is a cross-sectional view of a truck door sealing system in accordance with the present disclosure, taken along line 2-2 of FIG. 1;

FIG. 4 is a partial cross-sectional view of another embodiment of an outer truck door seal in accordance with the present disclosure, taken along line 2-2 of FIG. 1; and FIG. 5 is a partial cross-sectional view of the installation process of a truck door seal in accordance with the present disclosure, taken along line 2-2 of FIG. 1.

Corresponding reference characters indicate corresponding parts throughout the several views. The exemplifications set out herein illustrate exemplary embodiments of the invention, and such exemplifications are not to be construed as limiting the scope of the disclosure in any manner.

DETAILED DESCRIPTION

Figure 3:
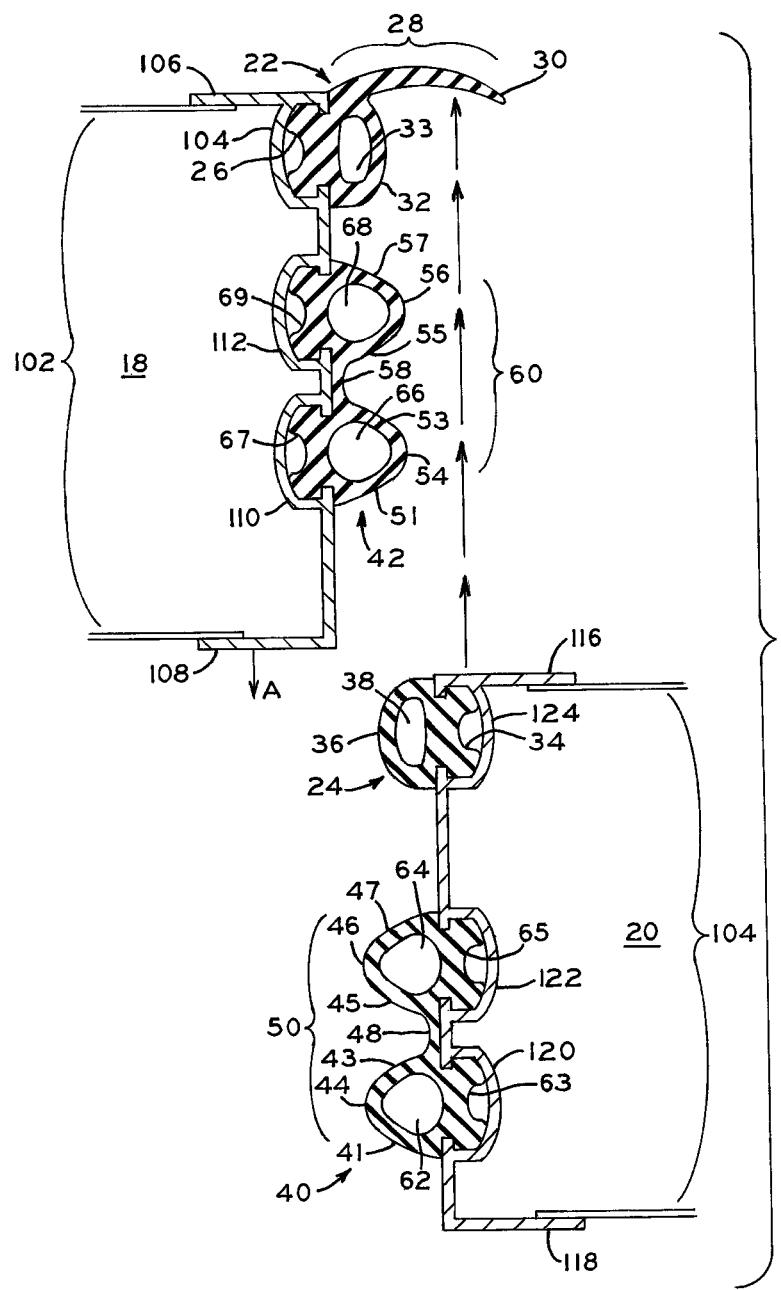
FIG. 3 is another cross-sectional view of the seal shown in FIG. 2, taken along line 2-2 of FIG. 1, in which one door is illustrated in a closed position and the other door is approaching a closed position.

Large trucks, such as semi-trailer trucks, often need seals at the rear opening of a cargo trailer between the trailer's rear frame and a pair of hinged rear doors used to close the trailer. Additional sealing is also often needed between the rear doors themselves.

The present seal arrangement provides one-piece, monolithic seals designed for installation on respective hinged trailer doors for semi-trailer trucks, and particularly the thick hinged doors associated with insulated cargo trailers (e.g., of the type used for transport of frozen or cold cargo). Each one-piece seal is made of four individually extruded sections, or extrusion members, which are made of a resilient, elastically deformable/compressible material. The extrusion members are heat fused or welded together to form a four-sided, one-piece, monolithic seal having a closed profile sized to fit a particular door. This one-piece design of the respective seals used in the present seal arrangement ensures that there is no leak path across each seal when the seals are placed on a door of a semi-trailer truck, while also inhibiting thermal transfer around the periphery of the closed double doors.

While the seals of the present disclosure are discussed in terms of semi-trailer truck doors, other uses are also contemplated. For example, doors on shipping containers, railroad boxcars and buildings may be used with seals that extend around the entire perimeter of such doors and that are made in accordance with the present disclosure. Moreover, any aperture or opening that is sealingly blocked with a cover of comparable size and shape may benefit from the application of seals made in accordance with the present disclosure.

Referring now to FIG. 1, trailer 10 of a refrigerating semi-trailer truck is shown having cooling unit 12 and cargo box 15. Cargo box 15 has five sides sealed to one another to define a cargo space therein, with an open sixth side of cargo box 15 sized to transfer cargo to and from the cargo space. This open sixth side of cargo box 15 is selectively closed by a rear door assembly including a generally rectangular rear frame 16 and a pair of hinged doors 18 and 20. As illustrated, the double hinged arrangement of doors 18 and 20 is a "French door" type in which opposite vertical edges of doors 18, 20 are hinged to adjacent vertical members of rear frame 16, while the adjacent vertical edges of doors 18, 20 near the middle of the opening in rear frame both swing outwardly and away from one another as doors 18 and 20 are pivoted from the closed position to the open position.

1. Seal Configurations and Characteristics

In the following description, the terms "inner," "interior" and other like terms denote a position relatively closer to the interior (i.e., cargo space) of cargo box 15 (FIG. 1). Conversely, terms such as "outer," "exterior" and other like terms denote a position that is relatively distanced from the interior of cargo box 15 (FIG. 1). For example, if a pair of structures include an "inner" structure and an "outer" structure, the "inner" structure is closer to the interior space of cargo box 15 relative to the "outer" structure, while the "outer" structure is closer to the ambient space outside of cargo box 15 relative to the "inner" structure.

In general, referring to FIG. 2, to seal the gap between doors 18 and 20, first exterior seal 22 sealingly engages second exterior seal 24 and first inner seal 42 engages second inner seal 40, to form a dual, gap-bridging seal interaction. FIG. 3 illustrates a cross-sectional view of doors 18 and 20 in a partially-open configuration, with door 20 in a closed position and door 18 approaching a closed position. More particularly, first door 18 is shown pivoting from an open position toward a closed position along the direction of arrow A. In the exemplary embodiment shown in FIG. 1, second door 20 is also able to pivot between open and closed positions in a similar fashion. If it is desired for second door 20 to be closed upon first door 18 (i.e., the reverse of the arrangement shown in FIG. 3), first and second exterior seals 22 and 24 and first and second seals 42 and 40 may be interchanged.

Referring to the closed and sealed configuration of doors 18 and 20 as shown in FIG. 2, first exterior seal 22 has an elastically deformable, pliable body including mounting portion 26, which fits within mounting opening 114 of door frame 102, and sealing portion 28. Both mounting portion 26 and sealing portion 28 are formed integrally with one another as a single, monolithic structure, such as via extrusion. Sealing portion 28 includes first sealing lobe 30 and second sealing lobe 32. First sealing lobe 30 has an elongate, arcuate profile that spans the gap between doors 18 and 20 and is substantially aligned with and seated upon the exterior of outer connecting wall 106 of door frame 102 when doors 18, 20 are closed. As described in further detail below, sealing lobe 30 presents an initial, outer physical and thermal barrier between the exterior and interior of cargo box 15 through the gap between doors 18 and 20.

Second sealing lobe 32 includes elliptical hollow 33, which aids in producing a controlled, repeatable compression of second sealing lobe 32 against lobe 36 when doors 18 and 20 are in the closed position, as also described further below. Second sealing lobe 32 therefore cooperates with the adjacent lobe 36 to provide a second, inner thermal and physical barrier disposed inwardly of outer sealing lobe 30.

Second exterior seal 24 has an overall shape and configuration similar to first exterior seal 22, except without exterior sealing lobe 30 as best seen in FIG. 3. Second exterior seal 24 includes mounting portion 34, which fits within opening 124 formed on door frame 104 and may have the same cross-sectional profile of mounting portion 26 of seal 22. Sealing lobe 36, which extends from mounting portion 34, includes elliptical hollow 38 similar to sealing lobe 32 of seal 22. When doors 18, 20 are in their respective closed configurations (FIG. 2), sealing lobe 36 resilient deforms against sealing lobe 32 such that both of elliptical hollows 33, 38 are compressed, and sealing lobes 32, 36 cooperate to sealingly bridge the gap between doors 18 and 20.

FIG. 4 illustrates an alternative exterior trailer door seal arrangement in accordance with the present disclosure. The embodiment of FIG. 4 includes first and second exterior seals 70 and 74 which cooperate to provide an initial, external seal against ingress of fluid or contaminants similar to seals 22, 24 described above. Like first exterior seal 22, first deformable, pliable body including mounting portion 76 and first sealing lobe 80, which are integrally and monolithically formed as a single structure. Sealing lobe 80 has an elongate, arcuate profile that spans the gap between doors 18 and 20 and is substantially aligned with and seated upon the exterior of outer connecting wall 106 of door frame 102 when doors 18, 20 are closed. However, seals 70, 74 lack a structure analogous to mutually abutting sealing lobes 32, 36. Rather, first exterior seal 70 has bumper 72 and second exterior seal 74 has bumper 78, both of which partially span the gap between the doors when doors 18 and 20 are in the closed position and provide for firm fixation of seals 70, 74 within mounting openings 114 and 124 respectively.

Turning again to FIGS. 2 and 3, the present seal arrangement may further include first and second dual inner seals 42 and 40 installed to doors 18 and 20, respectively. First inner seal 42 (shown in FIG. 3 in its undeformed configuration) includes inner lobe 54 and outer lobe 56, which are connected to one another by connecting portion 58 to form a unitary, monolithically formed dual-lobe structure Inner lobe 54 includes inwardly-facing wall 51 and outwardly-facing wall 53, while outer lobe 56 similarly defines inwardly-facing wall 55 and outwardly-facing wall 57. Together, inwardly-facing wall 55, connecting portion 58, and outwardly-facing wall 53 define lobe receiving space 60, which facilitates an interlocking seal between first and second dual inner seals 42 and 40 as will be described further below. First dual inner seal 42 includes generally cylindrical hollows 66 and 68 which facilitate deformation of seal 42 upon establishment of the interlocking seal.

Second inner seal 40 may have a cross section similar or identical to first inner seal 42. As best shown in FIG. 3, second inner seal 40 includes inner lobe 44 and outer lobe 46, which are joined together by connecting portion 48 into a unitary, monolithically formed dual-lobe structure. Inner lobe 44 includes inwardly-facing wall 41 and outwardly-facing wall 43, while outer lobe 46 includes inwardly-facing wall 45 and outwardly-facing wall 47. Together, inwardly-facing wall 45, connecting portion 48, and outwardly-facing wall 43 define lobe receiving space 50. Second dual inner seal 40 includes generally cylindrical hollows 62 and 64 which facilitate deformation of seal 42 upon establishment of an interlocking seal.

Turning again to FIG. 2, when both doors 18, 20 are in their respective closed positions, first sealing lobe 30 of first exterior seal 22 deflects such that lobe 30 is pressed against outer wall 116 to form an outer fluid-tight seal between doors 18 and 20. Meanwhile, second sealing lobe 36 of second exterior seal 24 and second sealing lobe 32 of first exterior seal 22 mutually deform against one another, such that the gap between doors 18 and 20 is bridged by a fluid-tight seal engagement disposed just interior of exterior seal 22. In this way, two sealing layers are established by the interaction of seals 22 and 24: inner lobes 32, 36 deform against one another to form a first, inner seal within the gap between doors 18, 20, while first sealing lobe 30 resiliently biases against wall 116 to form a second, redundant outer seal between the closed doors 18, 20.

Inner seals 40, 42 form yet another multiple-engagement barrier to fluid and thermal transfer between cargo box 15 and the ambient environment. As door 18 moves towards door 20 during the transition from the open position to the closed position (e.g., along direction A as shown in FIG. 3), first inner seal 42 abuts, and then slides across, second inner seal 40 causing mutual deformation thereof. When in the closed position shown in FIG. 2, outer lobe 46 of second inner seal 40 interfits within lobe receiving space 60 of first inner seal 42 and inner lobe 44 of first inner seal 42 interfits within receiving space 50 of second inner seal 40.

This interfitting arrangement creates three mutual lobe-on-lobe deformations which act to create fluid tight sealing engagements between first inner seal 42 and second inner seal 40: (1) inwardly-facing wall 55 abuts outwardly-facing wall 47; (2) inwardly-facing wall 45 abuts outwardly-facing wall 53; and (3) inwardly-facing wall 51 abuts outwardly-facing wall 43. Further, generally cylindrical hollows 62, 64, 66, and 68, in cooperation with air pockets that form between a tip of inner lobe 54 and connecting portion 48 and between tip of outer lobe 46 and connecting portion 58, create a total of six air barriers in the gap between doors 18 and 20. These six air barriers are serially disposed between the interior of cargo box 15 and the ambient environment, and each additional air barrier serves to further inhibit thermal transfer across the interfitted inner seals 40, 42 and thereby prevent thermal losses from within trailer 10 to the ambient environment. In addition, a sealed space between exterior seals 22, 24 and inner seals 40, 24 is formed, creating yet another air barrier. Elliptical hollows 33, 38 cooperate to form still another air barrier. Finally, sealing lobe 30 defines yet another sealed space exterior of seal 24 and outer wall 116 and interior of the inner surface of lobe 30.

In the illustrated embodiments, the seals are installed in door frames that are secured to doors 18 and 20. Referring to FIGS. 2 and 3, door frame 102 is attached to door 18 and door frame 104 is attached to door 20, with each door frame extending the entire perimeter of each door to accommodate seals that seal the entirety of rectangular openings 19 (shown in FIG. 1). For example, referring to FIG. 3, door frame 102 includes inner wall 108, outer wall 106, and three mounting openings 110, 112, and 114 into which the mounting portions of the various seals may be installed (the installation process will be described further below). Specifically, mounting portion 26 of first exterior seal 22 fits into mounting opening 114 and mounting portions 67 and 69 of first dual inner seal 42 fit into mounting openings 110 and 112, respectively. Likewise, for door frame 104, mounting portion 34 of second exterior seal 24 fits into mounting opening 124 and mounting portions 63 and 65 of second dual inner seal 40 fit into mounting openings 120 and 122, respectively.

Referring to FIG. 2, when doors 18 and 20 are in the closed position, mounting openings 110 and 112 and opposing mounting openings 120 and 122 are staggered such that the mounting openings 110, 112 on door frame 102 are closer to the exterior of doors 18 and 20 than the corresponding mounting openings 120, 122 of door frame 104. This staggered arrangement facilitates the interfitting of first inner seal 42 and second inner seal 40 when doors 18 and 20 are in the closed position (described in detail above). Of course, alternatively, the mounting openings on door frame 104 could also be staggered closer to the exterior of doors 18 and 20 than the mounting openings on door frame 102, as required or desired for a particular application.

2. Seal Installation

Referring to FIGS. 2 and 3, as noted above, door frames 102 and 104 facilitate the easy installation of first and second exterior seals 22 and 24 and first and second dual inner seals 42 and 40. Each of seals 22, 24, 40 and 42 has one or two mounting portions that are sized to be secured tightly within mounting openings formed along each door frame, taking advantage of each seal's elasticity, resilience and flexibility. For example, referring to FIG. 5, a step of the installation process of first dual inner seal 42 is shown. First, a part of mounting portion 69 is inserted into mounting opening 112. Second, by applying pressure to the space between connecting portion 58 and mounting portion 69 using tool 90, the remaining part of mounting portion 69 can be deformed and wedged into mounting opening 112. When fully received within opening 112, sealing portion resiliently returns to its original shape and configuration, thereby conforming to the inner profile of opening 112 as shown in FIG. 2.

The above-described installation process can be used along the entire length and periphery of first dual inner seal 42 to fill the entire perimeter of either door 18 or 20. This process can also be used on the similarly shaped mounting portions 67 of seal 42, and on mounting portions 26, 34, 63 and 65 of other seals 22, 24 and 40 respectively.

3. Methods of Seal Production

In an exemplary embodiment, each of the seal portions is produced independently by extruding pliable material at an elevated temperature through an appropriately shaped die. A single continuous strip of extruded material may therefore be produced and cut to length for each of the three seal profiles shown in FIGS. 2-5 and described above (it being understood that seals 40 and 42 have the same profile in the exemplary illustrated embodiment). A unique extrusion profile may be created for different size seals to span a given gap between doors 18 and 20.

Four seal portions are then cut to appropriate lengths corresponding to each of the four sides of door 18 and/or door 20. Respective ends of these four seal portions are then fused to one another to form the four seal portions into a single, unitary, monolithic truck door seal having a generally rectangular central opening 19 (FIG. 1). This fusing process is repeated for the other seal profiles in the present seal arrangement, as well as for the other of doors 18, 20. Methods of fusing the corners in accordance with the present disclosure are discussed in detail below.

As noted above, each seal may be made of a resilient, elastically deformable and/or compressible material. Such materials may include natural rubber, silicone, isoprene, ethylene propylene ("EPM") or ethylene propylene diene monomer ("EPDM") rubber, a mixture of cross-linked EPDM rubber and polypropylene, such as SANTOPRENE® (SANTOPRENE® is a registered trademark of the Exxon Mobil Corporation of Irving, Tex.), or any other suitable material. In an exemplary embodiment, the material used for the seals has good resistance to compression set, resists degradation from exposure to UV light and other environmental impacts, and remains pliable in cold temperatures.

In an exemplary embodiment of the present disclosure, such as the embodiments illustrated in FIGS. 1-5, the seal material is made from EPDM, which has been found exhibit the above-mentioned exemplary qualities for superior longevity in the environments normally encountered by shipping trailers. For example, normal use of a truck door seal made in accordance with the present disclosure may subject the seal to repeated deformations over time, such as by repeated opening and closing of the doors to which the seal is attached, or to vibrations and deformations resulting from movement of the vehicle with which the doors are associated. Forming the seal from a material highly resistant to compression set, such as EPDM, renders the seal well-suited for use in the potentially harsh service environments encountered in the shipping industry. Even after repeated deformations, the above-mentioned seal materials maintain their original shape and elasticity and are therefore able to maintain the desired sealing effect over time. In one exemplary embodiment, EPDM having a durometer of about 60 may be used. When the seals are monolithic as described herein, the durometer of the entirety of such seals is the same throughout respective seal cross sections.

Two exemplary methods of fusing the seal portion corners include fusing the seal portions at a miter cut and injection molding the seal corners. In the first method, two respective seals are miter cut at their edges at 45-degree angles. The miter-cut edges are abutted and heated in order to fuse the two seal portions to one another at a 90-degree angle. The heat fusing of the extrusion members may be effected in various ways including fusing of mitered edges and injection molding.

In the second method of fusing the seal portion corners, each seal portion may have regular or plain-cut ends, i.e., the plane of the cut surface may be transverse to the direction of extrusion. These cut ends may then be placed adjacent one another beneath an injection molding head and adjacent an injection-molding die, with a corner of the cuts touching or nearly touching. The void at the seal corner is then filled by injecting molten seal material into the injection-molding die, and allowing such molten rubber to contact and fuse to each seal end.

However the corners are fused, the seals form continuous and uninterrupted "bulbs" around the entire periphery of the seal. Further discussion of exemplary fusing processes which may be used with the present seal arrangements are presented in U.S. Pat. No. 8,839,564, entitled TRAILER DOOR SEAL, filed Jul. 28, 2011 and assigned to the present assignee, the entire disclosure of which is hereby expressly incorporated by reference herein.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sealing system for sealing a space between a pair of hinged doors, said sealing system comprising:
a first elastically deformable inner seal having a first inner lobe and a first outer lobe defining a first lobe receiving space therebetween; and
a second elastically deformable inner seal having a second inner lobe and a second outer lobe defining a second lobe receiving space therebetween,
the first lobe receiving space sized to receive the second outer lobe such that the second outer lobe sealingly abuts the first inner lobe and the first outer lobe, and
the second lobe receiving space sized to receive the first inner lobe such that the first inner lobe sealingly abuts the second inner lobe and the second outer lobe,
whereby the first inner seal and the second inner seal are arrangeable in a staggered fashion to form a seal in a space between the two doors.

2. The sealing system of claim 1, wherein the pair of inner seals have a substantially identical cross-sectional shape.

3. The sealing system of claim 1, wherein the first inner seal includes a first connecting portion connecting the first inner lobe to the first outer lobe to form a unitary, monolithically formed dual-lobe structure.

4. The sealing system of claim 3, wherein the first inner seal defines a uniform durometer throughout a cross section of the first inner seal.

5. The sealing system of claim 1, wherein the second inner seal includes a second connecting portion connecting the second inner lobe to the second outer lobe to form a unitary, monolithically formed dual-lobe structure.

6. The sealing system of claim 5, wherein the second inner seal defines a uniform durometer throughout a cross section of the second inner seal.

7. The sealing system of claim 1, wherein each of the first inner lobe, the first outer lobe, the second inner lobe and the second outer lobe defines a generally cylindrical hollow as viewed in cross-section.

8. The sealing system of claim 1, wherein the first inner seal and the second inner seal are both formed from EPDM.

9. The sealing system of claim 1, further comprising:
a first exterior seal having a mounting portion and a sealing portion, the sealing portion including a first sealing lobe having an elongate, arcuate profile and a second sealing lobe disposed interior of the first sealing lobe; and
a second exterior seal having a mounting portion and a sealing portion including a third sealing lobe,
the first sealing lobe resiliently deformable against an outer surface of one of the pair of hinged doors to form a first exterior sealing engagement, and the second and third sealing lobes resiliently deformable against one another to form a second exterior sealing engagement interior of the first exterior sealing engagement.

10. The sealing system of claim 9, wherein the second sealing lobe of the first exterior seal and the third sealing lobe of the second exterior seal each include a respective elliptical hollow in cross-section.

11. The sealing system of claim 9, wherein the mounting portion and the sealing portion of the first exterior seal form a unitary, monolithically formed structure.

12. The sealing system of claim 9, wherein the mounting portion and the sealing portion of the second exterior seal form a unitary, monolithically formed structure.

13. A sealing system for sealing a space between a pair of hinged doors, said sealing system comprising:
   a first hinged door pivotable between a first open position and a first closed position;
   a second hinged door pivotable between a second open position and a second closed position, the first and second hinged doors having adjacent vertical edges which swing outwardly and away from one another as the first and second hinged doors pivot from the first and second closed positioned toward the first and second open positions respectively;
   a first inner seal attached to the first hinged door and having a first inner lobe and a first outer lobe defining a first lobe receiving space therebetween; and
   a second inner seal attached to the second hinged door and having a second inner lobe and a second outer lobe defining a second lobe receiving space therebetween,
   the first inner seal attached in a staggered arrangement with respect to the second inner seal such that, when the first and second doors and in the first and second closed positions respectively, the first lobe receiving space sealingly receives the second outer lobe and the second lobe receiving space sealingly receives the first inner lobe to form a redundant seal in a space between the first and second hinged doors.

14. The sealing system of claim 13, wherein each of the first inner lobe, the first outer lobe, the second inner lobe and the second outer lobe defines a hollow as viewed in cross-section, whereby at least four air barriers are formed between an interior and exterior of the first and second hinged doors when the first and second hinged doors are in the first and second closed positions respectively.

15. The sealing system of claim 14, wherein an outer air pocket is formed between the first lobe receiving space and the second outer lobe, and an inner air pocket is formed between the second lobe receiving space and the first inner lobe, such that at least six air barriers are formed between an interior and exterior of the first and second hinged doors when the first and second hinged doors are in the first and second closed positions respectively.

16. The sealing system of claim 15, further comprising:
   a first exterior seal comprising:
      a first mounting portion attached to the first hinged door; and
      a first sealing portion including a first sealing lobe having an elongate, arcuate profile and a second sealing lobe disposed interior of the first sealing lobe; and
   a second exterior seal comprising:
      a second mounting portion attached to the second hinged door; and
      a sealing portion including a third sealing lobe,
   the first sealing lobe resiliently deformed against an outer surface of one of the pair of hinged doors to form a first exterior sealing engagement when the first and second hinged doors are in the first and second closed positions respectively, and
   the second and third sealing lobes resiliently deformed against one another to form a second exterior sealing engagement interior of the first exterior seal when the first and second hinged doors are in the first and second closed positions respectively.

17. The sealing system of claim 16, wherein the second sealing lobe of the first exterior seal and the third sealing lobe of the second exterior seal each include a respective hollow in cross-section which cooperate to form a first exterior air pocket, whereby at least seven air barriers are formed between an interior and exterior of the fust and second hinged doors when the first and second hinged doors are in the first and second closed positions respectively.

18. The sealing system of claim 17, wherein the first sealing lobe defines a sealed space exterior of the second exterior seal and an outer wall of the second hinged door, and interior of an inner surface of the first sealing lobe to forms a second exterior air pocket, whereby at least eight air barriers are formed between an interior and exterior of the first and second hinged doors when the first and second hinged doors are in the first and second closed positions respectively.

19. The sealing system of claim 16, wherein the first inner seal, the second inner seal, the first exterior seal and the second exterior seal are all formed from EPDM.

20. The sealing system of claim 13, wherein:
   the first inner seal includes a first connecting portion connecting the first inner lobe to the first outer lobe to form a first unitary, monolithically formed dual-lobe structure; and
   the second inner seal includes a second connecting portion connecting the second inner lobe to the second outer lobe to form a second unitary, monolithically formed dual-lobe structure.

* * * * *